United States Patent Office

2,709,169
Patented May 24, 1955

2,709,169

1,4-ARALKYLPIPERAZINES AND METHOD OF MAKING SAME

Henri Morren, Forest-Brussels, Belgium, assignor to Union Chimique Belge Société Anonyme, Brussels, Belgium, a Belgian company No Drawing. Application February 12, 1952, Serial No. 271,287

Claims priority, application Belgium February 15, 1951

14 Claims. (Cl. 260—268)

It is known that several derivatives of the piperazine substituted on the nitrogen atoms, i. e. in positions 1 and 4, have therapeutical properties. For this reason, asymmetrically substituted derivatives have been prepared, which correspond to the type R–N($C_4H_8$)N–R′ where R and R′ are different substituents, respectively containing cyclic groups and aliphatic groups.

An object of the present invention is to provide new derivatives of piperazine substituted on the nitrogen atoms with aralkyl groups R and R′ of different kinds, whereby the therapeutical value of these preparations as histamine antagonists (see Hamlin et al. J. A. C. S. 71, 2731–4) is considerably enhanced. I have found that this result is obtained with substituent aralkyl groups R, R′ of different kinds, and more particularly when one of them is a benzhydryl group and the other a benzyl group, which groups may be substituted or not on the aromatic nucleus.

I have further found that new 1,4-aralkyl-piperazines of great value comprise substituted 1-benzhydryl-4-benzylpiperazines corresponding to the general formula

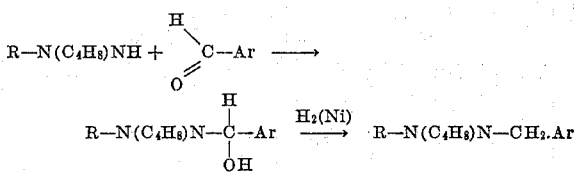

wherein Y, Y′ and Y″ may be identical or different and represent either a hydrogen or a halogen atom, or a lower alkyl radical, or a lower alkoxy radical; $n$ stands for the figure 1 when Y is a halogen, and either the figure 1 or the figure 2 when Y is an alkyl or an alkoxy radical.

These compounds may be prepared by causing a 1-aralkypiperazine to react on a halogen derivative of another aralkyl, i. e. a compound of the form

R–N($C_4H_8$)NH is reacted with a halogen derivative of R′, or inversely a halogen derivative of R is caused to react with a compound of the form HN($C_4H_8$)NR′. Another method of preparing compounds according to my invention is to produce an intermediate compound by the reaction between an R-substituted piperazine and an R′-compound containing an aldehydric function and to reduce said intermediate compound by means of hydrogen under pressure in the presence of a catalyst according to the following equation where R′ is —$CH_2.Ar$ (Ar=aryl):

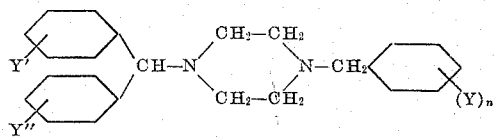

The following examples give further details about the nature of the invention, of the process of preparation and of the exact composition of the substituted benzhydryl and benzyl groups.

*Example 1.—1-benzhydryl-4-benzyl-piperazine*

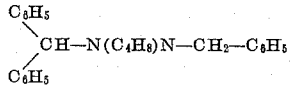

A mixture of 0.1 mol. monobenzylpiperazine, 0.1 mol. benzhydryl chloride and 0.11 mol. triethylamine in 125 cm.³ of toluene or xylene is heated in an autoclave vessel, for 4 hours at 150–160° C.

After cooling, the triethylamine hydrochloride is filtered and the filtrate is distilled. The resulting product is 1-benzhydryl-4-benzyl-piperazine of B. P. (boiling point) 200° C./1 mm. Hg crystallizing easily in alcohol: M. P. (melting point 120° C.

The same product is transformed into a dihydrochloride which after recrystallization in alcohol, melts at 225° C.

In lieu of triethylamine as acceptor of hydrohalogenic acid, it is possible to use sodium carbonate or bicarbonate, other inorganic bases, or organic bases such as quinoline, or it is possible previously to transform the benzylpiperazine into its sodium derivative by means of sodium amide. It is not necessary to heat in an autoclave vessel, but if such a vessel is not used the reaction mixture must be heated under reflux for several days and final yield is lower.

*Example 2.—1-benzhydryl-4-benzyl-piperazine*

0.1 mol. of monobenzhydrylpiperazine is dissolved in 100 cm.³ of toluene and 0.1 mol. of finely ground $NaNH_2$ is added. The mixture is heated under reflux for 1 hour, the mass is cooled and 0.1 mol. of benzyl chloride is then added. The whole is then heated under reflux for 2 hours.

The solvent is evaporated and the residue is dissolved in chloroform. This solution is washed with a saturated solution of $K_2CO_3$ and dried on $K_2CO_3$. The solvent is evaporated and the residue is distilled under high vacuum. The product of the condensation distills near 200° C./1 mm. Hg and, after recrystallization in alcohol, it melts at 120° C. The product is transformed into a dihydrochloride of M. P. 225° C., identical with the compound obtained in the preceding example.

In lieu of preparing the sodium derivative of the benzhydryl-piperazine which is subsequently treated with benzyl choloride, it is possible to perform the reaction on the benzhydrylpiperazine itself, by using an acceptor of hydrohalogenic acid such as sodium bicarbonate or other inorganic bases, or organic bases such as triethylamine.

*Example 3.—1-benzhydryl-4-benzyl-piperazine*

A mixture of 0.1 mol. of monobenzhydryl-piperazine, 45 gr. of benzaldehyde, 100 cm.³ of absolute alcohol and 5 gr. of Raney nickel is heated at about 50° C. for several hours under a pressure of 50 kg. of hydrogen. Afterwards, the catalyst is separated, the solvent is evaporated and the residue is fractionated under high vacuum.

The 1-benzhydryl-4-benzyl-piperazine boils near 205° C./1.5 mm. Hg and is transformed into a dihydrochloride identical with the compound obtained in Example 1.

According to any of the Examples 1, 2 or 3, it is possible to prepare substituted 1,4-aralkyl-piperazines corresponding to the general formula

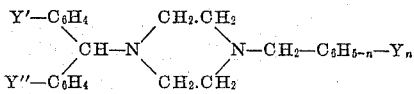

where Y, Y′ and Y″ may be identical or different, and represent a hydrogen or a halogen atom, an alkyl radical (CH₃ or C₂H₅) or an alkoxy radical (OCH₃ or OC₂H₅). In these cases, suitably substituted benzhydrylic and benzylic derivatives are used.

As regards the benzhydryl-piperazines substituted in para position which are necessary in Examples 2 and 3, these can be obtained, for instance, by condensation of the halogen derivatives or the corresponding benzhydryls with carbethoxypiperazine in the presence of a slight excess of triethylamine, in a toluenic medium, at about 150° C., in a closed vessel. The triethylamine hydrohalogen derivative is discarded, the solvent is evaporated and the residue is immediately treated with an alcoholic solution of KOH at the boiling point for 48 hours. After evaporation of the alcohol, the residue is treated with benzene and washed with water. The residue of the evaporation of the benzenic solution form the raw substituted benzhydrylpiperazine which is then reacted as described in Examples 2 or 3.

The substituted benzhydryl-piperazines may also be obained by catalytic debenzylation of compounds such as 1-p-halo, or 1-p-methyl-benzhydryl-4-benzyl-piperazine as hereafter described in Example 4.

*Example 4.—1-p-chlorbenzhydryl-4-p-methoxybenzyl-piperazine*

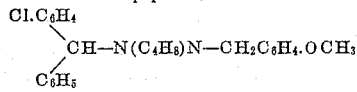

32.3 gr. of 1-p-chlorobenzhydryl-4-benzyl-piperazine, dissolved in 300 cm.³ of alcohol are heated in an autoclave vessel, in the presence of Raney nickel, under a pressure of 100 kg. H₂, at about 150° C. for 6 hours.

The catalyst is filtered, the solvent is evaporated and the residue is fractionated under a high vacuum. p-Chlorobenzylhydryl-piperazine (B. P. 180–185° C./1 mm. Hg) is isolated with a yield of 75%.

This product is then treated with p-methoxybenzyl chloride according to Example 2. 1-p-chlorobenzhydryl-4-p-methoxybenzyl-piperazine boils at 245–250° C./1.5 mm. Hg and the corresponding dihydrochloride melts at 210° C.

The same product may also be obtained according to Examples 1 or 3.

*Example 5.—1-p-chlorobenzhydryl-4-benzyl-piperazine*

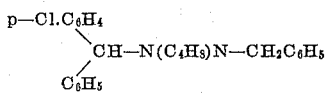

B. P. 235–240° C./0.5 mm. Hg
Dihydrochloride: M. P. 210° C.

*Example 6.—1-p-bromobenzhydryl-4-benzyl-piperazine*

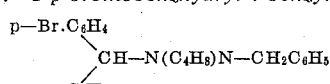

B. P. 240–245° C./1.5 mm. Hg
Dihydrochloride: M. P. 215° C.

*Example 7.—1-p,p'-dichlorobenzhydryl-4-benzyl-piperazine*

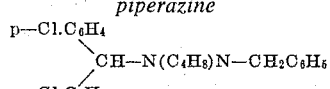

B. P. 200–205° C./0.5 mm. Hg
Dihydrochloride: M. P. 235° C.

*Example 8.—1-p-methylbenzhydryl-4-benzyl-piperazine*

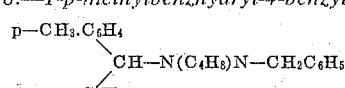

B. P. 210–220° C./1 mm. Hg
Dihydrochloride: M. P. 212° C.

*Example 9.—1-p-methoxybenzhydryl-4-benzyl-piperazine*

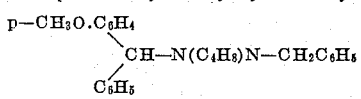

B. P. 220° C./2 mm. Hg
Dihydrochloride: M. P. 198° C.

*Example 10.—1-benzhydryl-4-p-methylbenzyl-piperazine*

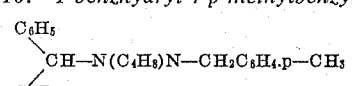

B. P. 215–220° C./1 mm. Hg
Dihydrochloride: M. P. (inst.) 218° C.

*Example 11.—1-p-chlorobenzhydryl-4-p-methylbenzyl-piperazine*

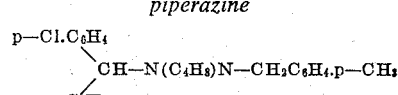

B. P. 225–230° C./1 mm. Hg
Dihydrochloride: M. P. 218° C.

p-Methylbenzyl-piperazine,

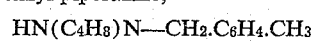

which is necessary when the products of Examples 10 and 11 are prepared according to the method of Example 1, is obtained by the action of a halogen derivative of p-methylbenzyl on piperazine or on carbethoxy-piperazine, in this last case followed by decarboxylation. p-Methylbenzyl-piperazine boils at 120° C./2 mm. Hg.

*Example 12.—1-benzhydryl-4-p-methoxybenzyl-piperazine*

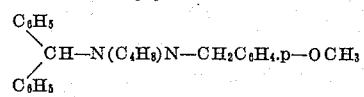

B. P. 225–230° C./1 mm. Hg. M. P. 114° C. (cryst. alcohol)
Dihydrochloride: M. P. 222° C.

*Example 13.—1-p-methylbenzhydryl-4-p-methoxybenzyl-piperazine*

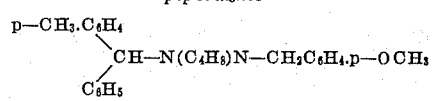

B. P. 240–250° C./1 mm. Hg
Dihydrochloride: M. P. (inst.) 218° C.

*Example 14.—1-benzhydryl-4-m-methylbenzyl-piperazine*

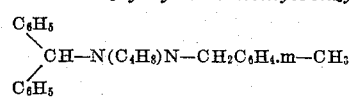

B. P. 226–227° C./2 mm. Hg. M. P. (recrystl. alcohol) 100° C.
Dihydrochloride: M. P. 222° C.

*Example 15.—1-benzhydryl-4-p-chlorobenzyl-piperazine*

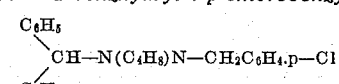

B. P. 230–232° C./1 mm. Hg
Dihydrochloride: M. P. 232° C.

*Example 16.—1-benzhydryl-4-p-ethylbenzyl-piperazine*

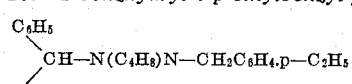

B. P. 205–210° C./1.5 mm. Hg
Dihydrochloride: M. P. 230° C.

*Example 17.—1-benzhydryl-4-p-ethoxybenzyl-piperazine*

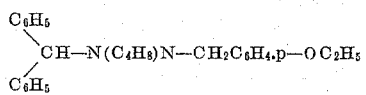

B. P. 248–250° C./2 mm. Hg.
Dihydrochloride: M. P. 212° C.

*Example 18.—1-o-methoxybenzhydryl-4-benzyl-piperazine*

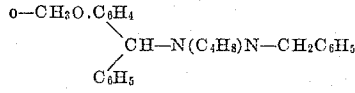

B. P. 210–215° C./2 mm. Hg
Maleate M. P. 172° C.

*Example 19.—1-m-chlorobenzhydryl-4-benzyl-piperazine*

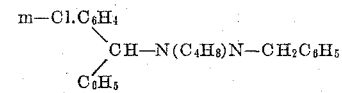

B. P. 225–230° C./1.5 mm. Hg
Dihydrochloride: M. P. 228° C.

*Example 20.—1-benzhydryl-4-o-methylbenzyl-piperazine*

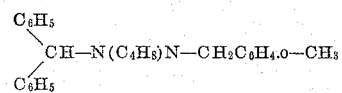

B. P. 200–205° C./1 mm. Hg
Dihydrochloride: M. P. 218° C.

*Example 21.—1-benzhydryl-4-o-methoxybenzyl-piperazine*

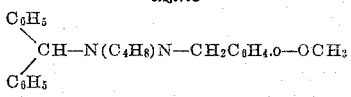

B. P. 225–230° C./1 mm. Hg
Dihydrochloride: M. P. 182° C.
Fumarate: M. P. 215° C.

*Example 22.—1-benzhydryl-4-m-ethoxybenzyl-piperazine*

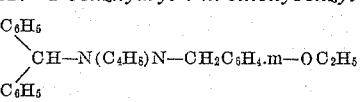

B. P. 215° C./1 mm. Hg. M. P. (recryst. alcohol) 82° C.
Dihydrochloride: M. P. 218° C.

*Example 23.—1-benzhydryl-4-m-chlorobenzyl-piperazine*

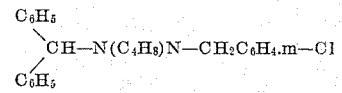

B. P. 205–210° C./2 mm. Hg. M. P. (recryst. alcohol) 96° C.
Dihydrochloride: M. P. 238° C.

*Example 24.—1-benzhydryl-4-(3', 5'-dimethylbenzyl)-piperazine*

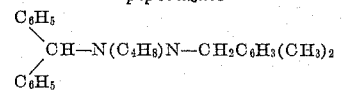

B. P. 233° C./2 mm. Hg. M. P. (recryst. alcohol) 128° C.
Dihydrochloride: 222° C.

*Example 25.—1-p-chlorobenzhydryl-4-m-methylbenzyl-piperazine*

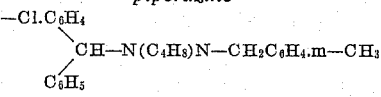

B. P. 230° C./2 mm. Hg.
Dihydrochloride: M. P. 215° C.

*Example 26.—1-o-methylbenzhydryl-4-benzyl-piperazine*

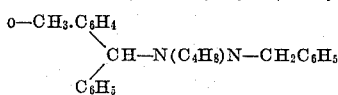

B. P. 195–200° C./2 mm. Hg.
Dihydrochloride: M. P. 210° C.

*Example 27.—1-o-bromobenzhydryl-4-benzyl-piperazine*

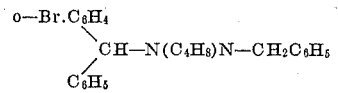

B. P. 210° C./0.5 mm. Hg.
Dihydrochloride: M. P. 232° C.

*Example 28.—1-m-ethoxybenzhydryl-4-benzyl-piperazine*

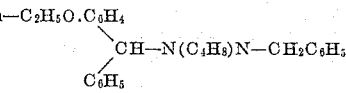

B. P. 215–220° C./2 mm. Hg
Dihydrochloride: M. P. 198° C.

*Example 29. — 1 - p - methoxy, p' - methylbenzhydryl-4-benzyl-piperazine*

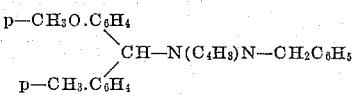

B. P. 245–247° C./1 mm. Hg
Dihydrochloride: M. P. 272° C.

*Example 30. — 1 - p,p' - dimethoxybenzhydryl-4-benzyl-piperazine*

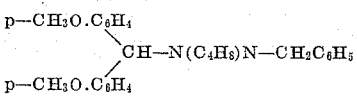

M. P. (recryst. alcohol) 100° C.
Dihydrochloride: M. P. 237° C.

*Example 31. — 1 - o,o' - dimethoxybenzhydryl-4-benzyl-piperazine*

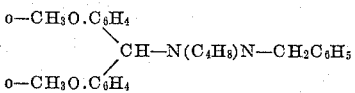

M. P. (recryst. alcohol) 102° C.
Dihydrochloride: M. P. 185° C.

*Example 32. — 1 - benzhydryl - 4 - p - (n-propyl)benzyl-piperazine*

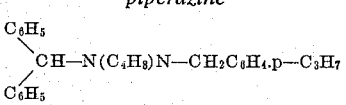

M. P. 108–110° C.
Dihydrochloride: M. P. 266° C.

*Example 33. — 1 - benzhydryl-4-p-(n-butyl)benzyl-piperizine*

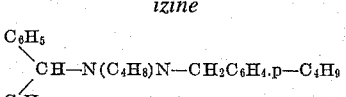

M. P. (inst.) 93° C.
Dihydrochloride: M. P. 224° C.

*Example 34.—1 - benzhydryl-4-p-(tertiary butyl)-benzyl-piperazine*

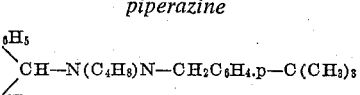

M. P. 139–141° C.
Dihydrochloride: M. P. 265° C.

Example 35.—1-benzhydryl-4-m-(tertiary butyl)-benzyl-piperazine $$\begin{array}{c} C_6H_5 \\ \diagdown \\ CH-N(C_4H_8)N-CH_2C_6H_4.m-C(CH_3)_3 \\ \diagup \\ C_6H_5 \end{array}$$

B. P. 198–201° C./0.05 mm. Hg
Dihydrochloride: M. P. 232° C.

Example 36.—1 - benzhydryl-4-(3',4'-dimethoxy)benzyl-piperazine $$\begin{array}{c} C_6H_5 \\ \diagdown \\ CH-N(C_4H_8)N-CH_2C_6H_3(OCH_3)_2 \\ \diagup \\ C_6H_5 \end{array}$$

M. P. 86–87° C.
Dihydrochloride: M. P. 230° C.

Example 37.—1 - p - chlorbenzhydryl-4-(3',5'-dimethyl-benzyl)-piperazine $$\begin{array}{c} p-Cl.C_6H_4 \\ \diagdown \\ CH-N(C_4H_8)N-CH_2C_6H_3(CH_3)_2 \\ \diagup \\ C_6H_5 \end{array}$$

B. P. 218–225° C./0.001 mm. Hg
Dihydrochloride: M. P. 231° C.

Example 38.—1 - p-chlorbenzhydryl-4-p-(n-butyl)benzyl-piperazine $$\begin{array}{c} p-Cl.C_6H_4 \\ \diagdown \\ CH-N(C_4H_8)N-CH_2C_6H_4.p-C_4H_9 \\ \diagup \\ C_6H_5 \end{array}$$

B. P. 220–230° C./0.001 mm. Hg
Dihydrochloride: M. P. 221° C.

Example 39.—1 - p - chlorbenzhydryl-4-p-(tertiary butyl) benzyl-piperazine $$\begin{array}{c} p-Cl.C_6H_4 \\ \diagdown \\ CH-N(C_4H_8)N-CH_2C_6H_4.p-C(CH_3)_3 \\ \diagup \\ C_6H_5 \end{array}$$

B. P. 230–240° C./0.001 mm. Hg
Dihydrochloride: M. P. 265–266° C.

Example 40.—1-p-chlorbenzhydryl-4-m-(tertiary butyl)-benzyl-piperazine $$\begin{array}{c} p-Cl.C_6H_4 \\ \diagdown \\ CH-N(C_4H_8)N-CH_2C_6H_4.m-C(CH_3)_3 \\ \diagup \\ C_6H_5 \end{array}$$

B. P. 217–220° C./0.1 mm. Hg
Dihydrochloride: M. P. 240° C.

The compounds of Examples 5 through 40 may be obtained according to the methods of Examples 1 through 3; the compounds of Examples 10 through 17 and 20 through 25 and 32 through 40 may also be prepared according to the method of Example 4.

I claim:

1. A process of making derivatives of piperazine substituted in positions 1 and 4 by aralkyl groups of different kinds, wherein one of said groups is selected from the group consisting of the benzhydryl radical and the benzhydryl radical substituted by at least one member of the group consisting of chloro, bromo, lower alkoxy and lower alkyl, and the other of said groups is selected from the group consisting of the benzyl radical and the benzyl radical substituted by at least one member of the group consisting of chloro, bromo, lower alkoxy and lower alkyl, said process comprising reacting a 1-aralkyl-piperazine with a halogen derivative of the other aralkyl group.

2. A process of making derivatives of piperazine substituted in positions 1 and 4 by aralkyl groups of different kinds, wherein one of said groups is selected from the group consisting of the benzhydryl radical and the benzhydryl radical substituted by at least one member of the group consisting of chloro, bromo, lower alkoxy and lower alkyl, and the other of said groups is selected from the group consisting of the benzyl radical and the benzyl radical substituted by at least one member of the group consisting of chloro, bromo, lower alkoxy and lower alkyl, said process comprising reacting a 1-aralkyl-piperazine wherein the aralkyl group is selected from the group consisting of the benzhydryl radical and the benzhydryl radical substituted by at least one member of the group consisting of chloro, bromo, lower alkoxy and lower alkyl with an aldehyde of the other aralkyl group and subjecting the product of reaction to hydrogenation.

3. A process of making derivatives of piperazine substituted in positions 1 and 4 by aralkyl groups of different kinds, wherein one of said aralkyl groups is the benzhydryl radical and the other is the benzyl radical, comprising reacting a 1-aralkyl-piperazine with a halogen derivative of the other aralkyl group.

4. A process of making derivatives of piperazine substituted in positions 1 and 4 by aralkyl groups of different kinds, wherein one of said aralkyl groups is the benzhydryl radical and the other is the benzyl radical, comprising reacting a 1-aralkyl-piperazine wherein the aralkyl group is the benzhydryl group with an aldehyde of the other aralkyl group and subjecting the product of reaction to hydrogenation.

5. A process of making derivatives of piperazine substituted in positions 1 and 4 by aralkyl groups of different kinds, wherein one of said aralkyl groups is a benzhydryl radical substituted on the aromatic nucleus by chloro and the other of said aralkyl groups is a benzyl radical substituted on the aromatic nucleus by lower alkyl, said process comprising reacting a 1-aralkyl-piperazine with a halogen derivative of the other aralkyl group.

6. A process of making derivatives of piperazine substituted in positions 1 and 4 by aralkyl groups of different kinds, wherein one of said aralkyl groups is a benzhydryl radical substituted on the aromatic nucleus by chloro and the other of said aralkyl groups is a benzyl radical substituted on the aromatic nucleus by lower alkyl, said process comprising reacting 1-aralkyl-piperazine wherein the aralkyl group is a benzhydryl radical substituted on the aromatic nucleus by chloro with an aldehyde of the other aralkyl group and subjecting the product of reaction to hydrogenation.

7. A 1,4-aralkylpiperazine of the formula $$R-N(C_4H_8)N-R'$$

wherein R and R' represent aralkyl groups of different kinds, one of said groups being a benzhydryl radical substituted on the aromatic nucleus by chloro and the other of said aralkyl groups is a benzyl radical substituted on the aromatic nucleus by lower alkyl.

8. A 1,4-aralkylpiperazine of the formula $$R-N(C_4H_8)N-R'$$

wherein R and R' represent aralkyl groups of different kinds, one of said groups being the benzhydryl radical and the other the benzyl radical.

9. A 1,4-aralkylpiperazine of the formula $$\begin{array}{c} Y' \\ \diagdown \\ \phantom{Y}CH-N(C_4H_8)N-CH_2-\phantom{(Y)_n} \\ \diagup \\ Y'' \phantom{CCCCCCCCCCCCC}(Y)_n \end{array}$$

wherein each of Y, Y' and Y'' represents a member selected from the group consisting of a hydrogen atom, a chlorine atom, a bromine atom, a lower alkyl radical, and a lower alkoxy radical, and n is the integer one when Y is a halogen, and an integer less than three when Y is a member selected from the group consisting of a lower alkyl radical and a lower alkoxy radical.

10. A process of making derivatives of piperazine substituted in positions 1 and 4 by aralkyl groups of different kinds, wherein one of said groups is selected from the group consisting of the benzhydryl radical and the benzhydryl radical substituted by at least one member of the group consisting of chloro, bromo, lower alkoxy and lower alkyl, and the other of said groups is selected from the group consisting of the benzyl radical and the benzyl radical substituted by at least one member of the group consisting of chloro, bromo, lower alkoxy and lower alkyl, said process comprising reacting a 1-aralkyl-piperazine with a derivative of the other aralkyl group, said derivative being selected from the group consisting of halogen and aldehyde.

11. 1 - p - chlorobenzhydryl - 4 - m - methylbenzyl piperazine.

12. 1 - p - chlorobenzhydryl - 4 - p - (tertiary butyl) benzyl-piperazine.

13. The process of making 1-p-chlorobenzhydryl-4-m-methylbenzyl-piperazine which comprises reacting m-methylbenzyl-piperazine with p-chlorobenzhydryl chloride.

14. A process of making 1-p-chlorobenzhydryl-4-p-(tertiary butyl) benzyl-piperazine which comprises reacting p- (tertiary butyl) benzyl-piperazine with p-chlorobenzhydryl chloride.

References Cited in the file of this patent
UNITED STATES PATENTS 2,415,785   Buck et al. _____ Feb. 11, 1947